Jan. 8, 1946. G. H. HILL 2,392,322
BLOOD TESTING CABINET
Filed Sept. 27, 1940
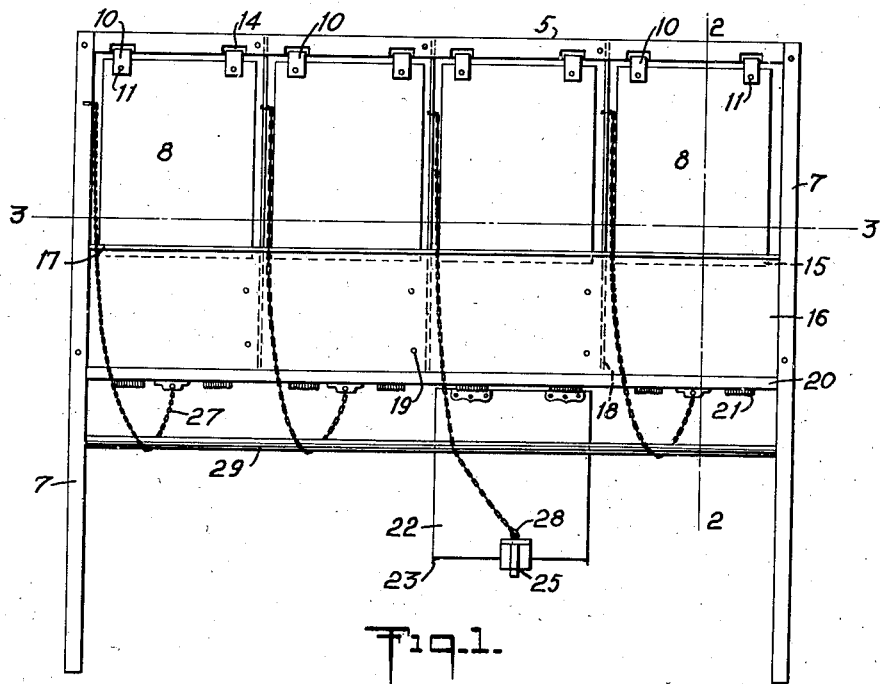
Fig. 1.
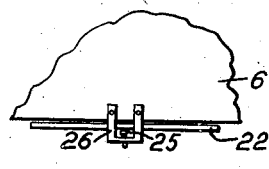
Fig. 4.
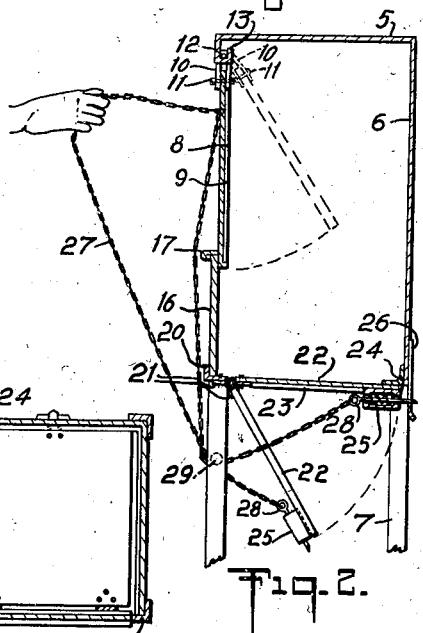
Fig. 2.
Fig. 3.
INVENTOR
GILBERT H. HILL
BY
Merrill M. Blackburn
ATTORNEY Patented Jan. 8, 1946

2,392,322

UNITED STATES PATENT OFFICE 2,392,322

BLOOD TESTING CABINET

Gilbert H. Hill, Fostoria, Iowa, assignor of one-half to Ray V. Bailey, Davenport, Iowa Application September 27, 1940, Serial No. 358,577

2 Claims. (Cl. 119—15)

This invention relates to cabinets employed in testing poultry; more specifically it provides a unique cabinet suitable for use in sorting poultry and other animals in testing for various diseases and imperfections.

In connection with the operation of baby chick hatcheries it is the custom for the operator to test the flocks of chickens from which he expects to obtain eggs to supply his hatchery. It is the normal procedure for the operator to visit each supply farm and test each individual bird for disease, especially pullorum. In conducting the test each bird is normally taken from a coop by an assistant and handed to the tester who takes a sample of blood from the wing and then places the bird in a common box to await the outcome of the test. After a short but appreciable period of time the test is read and the bird is then released if it is a non-reactor or placed in a special coop if it gives evidence of being infected with the disease. Testing several large flocks of birds in this manner requires not only a very considerable amount of time but also the services of three persons.

It is an object of my invention to provide a multicompartment cabinet adapted to materially increase the speed and decrease the man-power required in testing flocks of poultry for disease.

It is another object of this invention to provide a cabinet having one or more compartments into which birds may readily be placed and from which they may quickly and easily be removed.

Yet another object of my invention is to provide a multi-compartment cabinet capable of supporting a hot plate testing unit, said individual compartments being readily accessible for the introduction and removal of birds.

A still further object of this invention is to provide a testing cabinet having a multiplicity of separated compartments side by side, each individual compartment being provided with a swinging vertical door and a trap bottom door, all of said doors being easily operable by a person in front of the cabinet.

The general construction of my invention in its preferred form comprises a series of individual compartments, of a size such that they are each capable of receiving an individual full-grown fowl, arranged side by side in a cabinet having substantial length. Leg members are secured to the cabinet in such a manner that the top of said cabinet is at such a height that it is readily accessible to a standing man and its bottom is raised substantially above the ground. The bottom of the cabinet consists of a series of trap doors, each forming the floor of one of the compartments comprising said cabinet. In the front of the cabinet are a series of vertical swinging doors hinged at the top. Each of said vertical swinging doors comprises the upper part of the front of an individual compartment. The lower portion of the front of the cabinet and compartments is stationary and serves as a stop to regulate the outward swing of the hinged vertical doors.

In order that a more complete and clear understanding of my invention may be had reference should be made to the accompanying drawing forming a part thereof of which Fig. 1 is an elevation view showing the front of a cabinet embodying the preferred form of my invention.

Fig. 2 is a vertical sectional view of the cabinet shown in Fig. 1 taken on the line 2—2 thereof.

Fig. 3 is a horizontal sectional view of the cabinet taken on the line 3—3 of Fig. 1.

Fig. 4 is a fragmentary elevation of the rear of the cabinet.

The top 5 and the rear 6 of the cabinet may be continuous panels of any suitable material such as sheet metal. The legs 7, which support the cabinet in a spaced position from the ground, extend along the entire height of the cabinet at the corners, as this construction provides greater rigidity and durability in the structure. The said legs 7 consist of lengths of angle-iron of suitable thickness. The vertical doors 8 which form the upper portion of the front of the cabinet are constructed from sheet metal and provided with rigidity by means of flanges 9 extending along each side and across the bottom thereof. The doors 8 are swingingly supported at their tops by means of strips 10 of sheet metal, each end of which is secured to the door 8 by means of the rivet 11 and the folded center part of which hangs loosely over a wire 12. The wire 12 extends through the length of the cabinet being supported by reason of its being folded into the returned flange 13. Openings 14 are provided in the sheet metal around the wire 12 at the junctures at which the strips 10 are supported by said wire 12 in order to enable said strips 10 to rotate somewhat around said wire 12 thus permitting swinging motion in the doors 8. The doors 8 are prevented from swinging outwardly substantially beyond a vertical position by reason of the bottoms 15 of said doors coming into contact with the panel 16 which comprises the bottom portion of the front of the cabinet. Said panel 16 is reinforced by means of the flange 17. The partitions 18 which divide the cabinet into individual compartments are secured in position by the bolts 19. The angle-iron 20 which extends along the lower front corner of the cabinet serves as an anchoring base for one half of each of the hinges 21. The other half of each hinge is attached to one of the trap doors 22 each of which forms the floor of an individual compartment. The trap doors 22 are reinforced by means of flanges 23 extending along their edges. The hinges 21 are of a spring type such that they tend to close a trap door 22 after said door has been opened. The trap doors 22 are prevented from moving upwardly substantially beyond a horizontal position by means of the flange 24. The trap doors 22 are retained in a rigid closed position by means of latches 25 which engage suitable U-shaped catches 26 secured to the rear side of the cabinet adjacent the bottom thereof. Chains 27 secured at their upper ends to the partitions 18 and at their lower ends to the bolts 28 of the latches 25 serve, when pulled, to release the latches 25 and to swing the trap doors 22 into a downwardly inclined position such as that shown by the broken lines in Fig. 2 and the position of the open door in Fig. 1. The rod 29 which extends between the front legs of the structure at a point substantially below the bottom of the cabinet proper serves as a reinforcing member and also as a means for changing the direction of the pull of the chain 27 to enable said chain to release the latch 25 and swing downwardly the door 22 as previously described.

For the sake of clarity I have described very specifically the construction of the preferred form of my invention. It is most obvious that my invention is by no means limited by this detail of construction or even to the precise form here described for illustrative purposes. Among other things, hinges of any suitable type may replace the straps and wire construction here shown for supporting the vertical swinging doors 8, and other suitable latching means may replace the latches 25 and catches 26, or the latches may be omitted entirely if a sufficiently stiff yieldable means be employed for holding the trap doors 22 in a horizontal position. Again the springs in the hinges 21 may be eliminated entirely and an independent spring be employed to accomplish their purpose, and the position at which the trap doors 22 are hinged may be varied. The partitions 18 may be retained in position by any suitable method; moreover if rigidity and durability are not of foremost importance the flanges on the doors, the flange 17, and the angle-iron 20 may be omitted and the legs 7 need not extend the entire height of the cabinet. Again the trap doors 22 may form only a portion of the floor of the respective compartments. Further, the number of compartments contained in a given cabinet is in no way inherent in my invention.

In putting my invention into actual use in testing for pullorum the hatchery operator loads the cabinet, which is easily portable, into his car or pick-up and takes it to the residence of the farmer whose flock of poultry he desires to test. After unloading the cabinet he places a hot plate of the type normally used in this connection on the top of the cabinet. The hot plate is divided into a multiplicity of small squares onto each of which the operator places a small quantity of antigen. As soon as his assistant has handed him the first bird he takes a test sample of its blood and places it upon square No. 1 of the hot plate at the same time placing the bird through the vertical door into the left-hand compartment of the cabinet. This procedure is repeated three times, at the end of which each of the compartments of the cabinet contains a bird and there is a blood sample on each of the first four squares of the hot plate, the sample on square 2 having been taken from the bird in compartment 2 of the cabinet and so on. By the time four tests have been taken the first test may be read. This having been done the bird in compartment 1 is either released or re-cooped depending on whether or not it is a reactor. As the operator places a blood sample from bird No. 5 on square No. 5 of the hot plate he places bird No. 5 in compartment No. 1 of the cabinet and at the same time reads the test for bird No. 2. If bird No. 2 is a non-reactor, as is normally the case, he pulls the proper chain releasing bird No. 2 through the trap door. As he places bird No. 6 in compartment No. 2 and places its blood sample on square No. 6 of the hot plate, he reads the test for bird No. 3. This routine is repeated until the entire flock has been tested. In case a bird is a reactor it is removed from the compartment through the vertical door and re-cooped.

Through the use of my invention it is possible for two men to do the work that formerly required the services of three persons and in addition it very materially enhances the speed at which the testing process may be carried on for it provides especially accessible and very rapidly operating facilities for handling the individual birds. Moreover, it permits the operator to function very efficiently for in addition to eliminating the necessity of waiting for test reactions it enables him to perform a number of functions simultaneously.

The material from which my novel cabinet is constituted is not essential to my invention; however, sheet metal, expanded metal and heavy mesh are considered the most adaptable.

A number of modifications of my blood testing cabinet in its preferred form may be made without departing from the spirit and scope of my invention; therefore I wish to be limited herein only by the prior art and the appended claims.

Having thus described my invention, what I claim and desire to secure by Letters Patent is:

1. A cabinet for temporarily retaining animals comprising a housing, partitions within said housing dividing it into a horizontal row of compartments, a substantially vertical door in the front of each compartment, means for supporting each said vertical door from its top in such a manner that said doors are free to swing, a stationary member forming at least a part of lower portion of the front of each compartment and acting to limit the outward swing of the vertical door, a trap door capable of swinging downwardly in the bottom of each compartment forming at least a portion of the floor thereof, yieldable means tending to return said trap door to a horizontal position, latching means for securing said trap door rigidly in a horizontal position, means for releasing said latching means and for moving said trap door into a downwardly inclined position, said releasing and moving means being readily operable by a person in front of the cabinet, and legs for supporting said housing in a spaced position above the ground.

2. A cabinet of the type described comprising a plurality of compartments, a door in an exposed side, other than the bottom side of each compartment, a trap door in the bottom side of each compartment forming at least a portion of the floor of each compartment, and opening to the outside of said cabinet, latch means including a yieldably retractable member for retaining said trap door in a closed position at times, means for swinging said trap door downwardly, means for automatically closing said trap door placing the said latch in operatve engagement and legs supporting said compartments in spaced relation to the ground.

GILBERT H. HILL.